United States Patent Office 3,193,514
Patented July 6, 1965

3,193,514
POLYMERIC MATERIALS FROM THE REACTION OF ALKALI METAL ALUMINATE WITH AN AROMATIC SILICON HALIDE
William Randall Bamford, West Kilbride, Ayrshire, Scotland, assignor to Imperial Chemical Industries Limited, Millbank, London, England, a corporation of Great Britain
No Drawing. Filed May 29, 1961, Ser. No. 113,074
Claims priority, application Great Britain, June 15, 1960, 20,998/60
2 Claims. (Cl. 260—2)

The present invention relates to new and useful polymeric materials and more particularly to polymeric materials in which there are in the polymer chain silicon atoms having organo groups attached thereto.

A wide variety of polymeric materials containing silicon are known and a considerable number of these are widely used because of their many valuable and advantageous properties. Among these polymers, however, there are various groups which have not hitherto been widely used for a variety of reasons. Thus some are costly to prepare while others cannot readily be prepared or their preparation cannot easily be repeated to give the same product. Among such polymers there are a number which also contain aluminium.

An object of the present invention is to provide a process for the production of silicon-containing and aluminum-containing polymers. Another object is to provide such a process for the production of polymers having the recurring unit

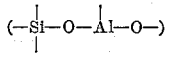

A further object is to provide new and useful polymers containing silicon and aluminium and having a ratio of silicon atoms to aluminium atoms of from 1:1 to 2:1. Other objects will appear hereinafter.

According to the present invention these objects are accomplished by a process comprising reacting together an alkali metal aluminate in aqueous solution and one or more compounds of the formula $R_aR'_bR''_cSiX_{4-(a+b+c)}$ where R is an aryl group, R' and R'' are alkyl, aryl, aralkyl, alkenyl, arylene or alkenyl groups, X is a halogen, $a$ is 1, 2 or 3, $b$ is 0, 1 or 2, $c$ is 0 or 1 and $a+b+c$ is not greater than 3, in an inert organic solvent.

The aluminate solution may be prepared by dissolving aluminium chloride in a solution of an alkali metal hydroxide. It is normally preferable to use sodium or potassium hydroxide. It is also normally preferred that the solution should be sufficiently alkaline to render the final mixture approximately neutral, i.e., of pH from about 5 to about 9.

A wide variety of organosilicon halides may be used in the process of our invention. It is, however, in general preferred that the halogen should be chlorine. Organosilicon halides suitable for use in the process of our invention include diphenyldichlorsilane, phenylmethyldichlorsilane, dibenzyldichlorsilane, phenyltrichlorsilane, substituted phenyl derivatives such as di-p- tolyldichlorsilane and di(p-bromophenyl)dichlorsilane, phenyltrichlorsilane, and the like. It is of course, also possible to use a mixture of two or more organosilicon halides in the process of our invention. Thus, for example, in some cases it may be convenient to use a mixture of a diorgano-dihalosilane and a triorganohalosilane to get the desired product.

The reaction may be carried out by simple mixing of the reacting solutions. This may be achieved in a variety of ways, for example, the organic solvent solutions may be rapidly added to the aqueous solution already in the reaction vessel. Alternatively the two solutions may be fed simultaneously in equivalent proportions into the reaction vessel or into a mixing chamber from which the mix passes to the reaction vessel. It is, of course, in all cases essential to have efficient agitation so that the reaction takes place in an emulsion.

It is in general, preferred to operate the process of our invention at temperatures up to about 40° C. Higher temperatures can be used but with increase in temperature there is an increasing tendency to get simple hydrolysis of the organosilicon halide to give an organopolysiloxane rather than the desired silicon-aluminium polymer. It is, however, particularly preferred to operate at temperatures within the range from 10 to 20° C.

The ratio of the reactants should be such that there is obtained only polymers having the recurrent group

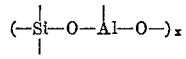

and not polymers having any

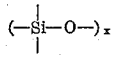

groups. This can be achieved by arranging that the ratio of silicon-bonded halogen atoms to aluminium atoms present is 3:1 and that the ratio of silicon atoms to aluminium atoms is not less than 1:1 or greater than 2:1. Thus for example, if a trifunctional organosilicon halide is used alone the ratio of silicon atoms to aluminium atoms is 1:1 while if a difunctional organosilicon chloride is used alone the ratio is 1.5:1 and the upper ratio of 2:1 obtains when there is used an equimolecular mixture of a difunctional organosilicon halide and a monofunctional organosilicon halide. It will of course, be obvious, that other mixtures of mono-, di-, and tri-functional organosilicon halides can be used provided the above ratio limitations are observed.

The polymeric products of our process will vary widely, for example, from fusible soluble materials to infusible insoluble brittle products, thus many of the products have valuable film forming properties while others are fibre forming and all are useful to some degree in the fields of electrical insulation or water repellent coatings. The properties will also vary with the nature of the organo groups attached to the silicon constituent. Furthermore one class of polymers, i.e. those in which there are silicon atoms having attached thereto two or more phenyl or substituted phenyl groups can be converted to insoluble polymers by heating at 150 to 250° C. During this curing process there is a loss of benzene or a substituted benzene accompanied by a degree of cross-linking of the polymer.

Our invention is further illustrated by the following examples in which all parts and percentages are by weight.

*Example 1*

96 parts of sodium hydroxide in 2000 parts of water was added carefully to 53.4 parts of aluminium chloride and 1600 parts of carbon tetrachloride in a reaction vessel after which the mixture was stirred and cooled to 15° C. The mixture was then vigorously agitated until an emulsion formed and 151.8 parts of diphenyldichlorsilane in 1600 parts of carbon tetrachloride rapidly added thereto after which vigorous mixing was continued for 20 minutes. The reaction mixture was then filtered and allowed to separate. The pH of the aqueous layer was 5. The organic layer was washed with water, dried over anhydrous sodium sulphate and evaporated to dryness giving 118 parts of a brittle resin. This product was found to be of molecular weight 4000 and to contain 12.3 percent silicon and 7.9 percent aluminium. It was also very soluble in benzene and acetone and could be recovered unchanged from boiling water. The theoretical product of formula $(C_{36}H_{30}Al_2O_6Si_3)_x$ contains 12.09 percent silicon and 7.74 percent aluminium.

Example 2

The process of Example 1 was repeated using 168.6 parts of dibenzyldichlorsilane, in place of the diphenyldichlorsilane. 120 parts, representing a 77 percent yield, of a clear straw-coloured resin were obtained. This resin was capable of forming films by melt casting at 100° C. or by solvent casting using carbon tetrachloride or benzene.

Example 3

The process of Example 1 was repeated using 229.2 parts of phenylmethyldichlorsilane in place of the diphenyldichlorsilane. The mixture was filtered and allower to separate as in Example 1. In this case there was retained on the filter 124 parts of a resinous product soluble in acetone and tetrahydrofuran. The filtrate was then treated as in Example 1 and there was recovered from the organic solvent layer 17 parts of a resinous product soluble in acetone, ether and benzene. The molecular weight of the latter product rose from 2000 to 6000 on boiling in benzene.

Example 4

42.3 parts of phenyltrichlorsilane in 1600 parts of carbon tetrachloride were reacted with 24 parts of sodium hydroxide and 26.7 parts of aluminium chloride dissolved in 2000 parts of water with 1600 parts of carbon tetrachloride added, in a manner similar to the reaction of Example 1. 31 parts of an insoluble, infusible polymer of high thermal stability were obtained.

Example 5

A solution of 50.6 parts of diphenyldichlorsilane and 58.9 parts of triphenylchlorsilane in 1600 parts of carbon tetrachloride was reacted with a solution of 26.7 parts of aluminium chloride and 48 parts of sodium hydroxide in 2000 parts of water with 1600 parts of carbon tetrachloride added in the manner described in Example 1. There was obtained 71 parts of a low melting resin which could be drawn into fibres.

Example 6

The process of Example 1 was repeated using a mixture of 76 parts of diphenyldichlorsilane and 84 parts of dibenzyldichlorsilane instead of the 151.8 parts of diphenyldichlorsilane. There was obtained 119 parts of a product which after heating at 200° C. for 2 hours gave a resin of softening point 210 to 220° C.

What I claim is:

1. A process for the production of polymeric materials comprising reacting together at a temperature of up to about 40° C. an alkali metal aluminate in aqueous solution and at least one compound of the formula, $$R_a R'_b R''_c SiX_{4-(a+b+c)}$$

where R is a monocyclic aryl and R' and R'' are selected from the group consisting of lower alkyl and monocyclic aryl, X is a halogen, $a$ is an integer from 1 to 3, $b$ is an integer from 0 to 2, $c$ is an integer from 0 to 1, and $a+b+c$ is not greater than 3, in an inert solvent, the reactants being used in amounts such that the ratio of silicon-bonded halogen atoms to aluminum atoms is 3:1 and the ratio of silicon atoms to aluminum atoms is not less than 1:1 or greater than 2:1.

2. A process for the production of polymeric materials comprising reacting together at a temperature of about 10° C. to about 20° C. an alkali metal aluminate selected from sodium aluminate and potassium aluminate in aqueous solution and at least one compound of the formula $R_a R'_b R''_c SiCl_{4-(a+b+c)}$ where R is a monocyclic aryl and R' and R'' are selected from the group consisting of lower alkyl and monocyclic aryl, $a$ is an integer from 1 to 3, $b$ is an integer from 0 to 2, $c$ is an integer from 0 to 1, and $a+b+c$ is not greater than 3, in an inert organic solvent, the reactants being used in amounts such that the ratio of silicon-bonded chlorine atoms to aluminum atoms is 3:1 and the ratio of silicon atoms to aluminum atoms is not less than 1:1 or greater than 2:1.

References Cited by the Examiner

UNITED STATES PATENTS

| | | | |
|---|---|---|---|
| 2,853,504 | 9/58 | Jenker | 260—448.2 |
| 2,998,407 | 8/61 | Foster et al. | 260—2 |
| 3,061,587 | 10/62 | Rust et al. | 260—46.5 |
| 3,153,006 | 16/64 | De Monterey | 260—2 |

OTHER REFERENCES

Resins-Rubbers-Plastics, Russian Supplement No. 2, August 20, 1958. Article by Andrianou et al., in Dohlady Academy Nauk, vol. 114, No. 5, 1957, re Synthesis of Polyaluminosiloxanes.

Journal of Polymer Science, 1958, vol. 30, pp. 513–24.

Organometallic Chemistry, Zeiss, 1960, at p. 244.

LEON J. BERCOVITZ, *Primary Examiner.*

HAROLD N. BURSTEIN, *Examiner.*